Dec. 20, 1966 W. LOHS 3,293,373

TELEPHONE SET

Filed Nov. 6, 1961 3 Sheets-Sheet 1

Dec. 20, 1966 W. LOHS 3,293,373

TELEPHONE SET

Filed Nov. 6, 1961 3 Sheets-Sheet 2

Dec. 20, 1966 W. LOHS 3,293,373

TELEPHONE SET

Filed Nov. 6, 1961 3 Sheets-Sheet 3

United States Patent Office 3,293,373
Patented Dec. 20, 1966

3,293,373

TELEPHONE SET

Willy Lohs, Munich, Germany, assignor to Siemens & Halske Aktiengesellschaft Berlin and Munich, a corporation of Germany Filed Nov. 6, 1961, Ser. No. 150,404
Claims priority, application Germany, Nov. 24, 1960, S 71,392
3 Claims. (Cl. 179—100)

This invention is concerned with a telephone set comprising a housing containing a relatively large number of individual component elements. The object of the invention is to simplify the construction of such a telephone set particularly insofar as the disposal of its component elements is concerned.

The component elements of such a telephone set are customarily disposed upon a mounting base, for example, upon the base plate of the housing, to which such elements are secured with the aid of special fastening means such as straps, screws and the like. It is also known to assemble the respective component elements of individual parts thereof by inserting such parts into receiving means formed on the mounting base of a telephone set and separately securing them in assigned position.

The object of the invention, namely, to simplify the construction of a telephone set particularly insofar as the disposal of its component elements is concerned, is realized by clamping at least some of the component elements thereof between mounting parts common thereto, thus securely holding the respective component elements in position.

The corresponding component elements can be initially loosely disposed with respect to a first mounting part and thereupon secured in position by a second mounting part which is assembled with the first mounting part and firmly connected therewith. Accordingly, a plurality of component elements of a telephone set and, if desired, substantially all its component element, are thus in simple manner secured in position in one operation.

The component elements, combined so to speak in a package, can in this way be disposed within the housing of a telephone set and securely fastened in place in shock-proof connection with the housing by interposing elastic inserts.

According to an advantageous feature of the invention, at least one of the mounting parts may be formed by a housing part of the telephone set, for example, by the housing cover or by the base plate of the housing.

An arrangement wherein the component elements are clamped in position between the housing parts utilizes in this manner structural parts which are at any rate present in any telephone set, thereby making special fastening means for the component elements superfluous. A special mounting base is in such case likewise superfluous.

In order to further simplify the assembly of the telephone set, means may be provided on one of the housing parts for receiving the respective component elements, which may be initially loosely inserted thereinto. The securing of the component elements in inserted position is in this manner further simplified since they need be secured substantially only against slipping from their respective receiving means, that is, against displacement in one direction. The receiving means may all be provided on one mounting part or may be distributed over both mounting parts, the respective second mounting part being utilized for securing the component elements in inserted position in their mounting means.

The component elements are advantageously provided with key guide means cooperating with complementary guide means provided in the receiving means so as to assure insertion of the respective component elements in proper position thereof.

Elastic inserts are advantageously provided between the mounting parts and the component elements, which is of particular advantage in rendering the telephone set insensitive to shocks so that damage can hardly result, for example, in case a set is accidentally dropped.

A particularly good utilization of space is obtained by arranging a plurality of component elements superposed and held clamped in position by the two mounting parts. For example, the ringer of the telephone set may be arranged underneath the dial mechanism, and both such component elements may be clamped in position jointly.

According to another feature of the invention, the interior wiring of the telephone set is provided upon a preferably plate-shaped insulating carrier, preferably in the form of a printed circuit, and such wiring carrier or plate is clamped in position between the two mounting parts. The wiring plate may also be utilized to serve as a carrier for some of the component elements of the telephone set, especially light weight components such as the induction coil, capacitors and resistors, the terminal wires of which may be extended through holes formed in the wiring plate for the soldering thereof to the wiring provided thereon.

The terminal wires of the component elements are in accordance with another feature of the invention provided with plug or connector means which are plugged into the wiring plate and secured in plugged-in position by a mounting part.

It is under consideration of the above described construction of the telephone set of advantage to combine contact spring sets, provided with actuating members, such as the hook switch and the grounding key or button, so as to form with the respective actuating members common component elements.

It is also advantageous to secure the component elements, which are initially loosely inserted into their respective receiving means in their inserted position, so as to avoid inadvertent dropping out thereof upon removal of the second or securing mounting part of the telephone set. Such auxiliary securing can be effected very simply since the principal securing of the component elements is effected by the clamping action of the two mounting parts.

The simplification according to the invention does not only benefit the assembly of the telephone set but also the maintenance thereof after it is put in operation. This will be appreciated upon considering the simplification achieved so far as the exchange of individual component elements is concerned. A telephone set according to the invention, comprising component elements clamped between two housing parts and having plug connections for all component parts and for the apparatus cords, does not require any particular tools for the maintenance thereof.

Further details and features of the invention will appear from the description of an embodiment which is rendered below with reference to the accompanying drawings.

Figure 1:
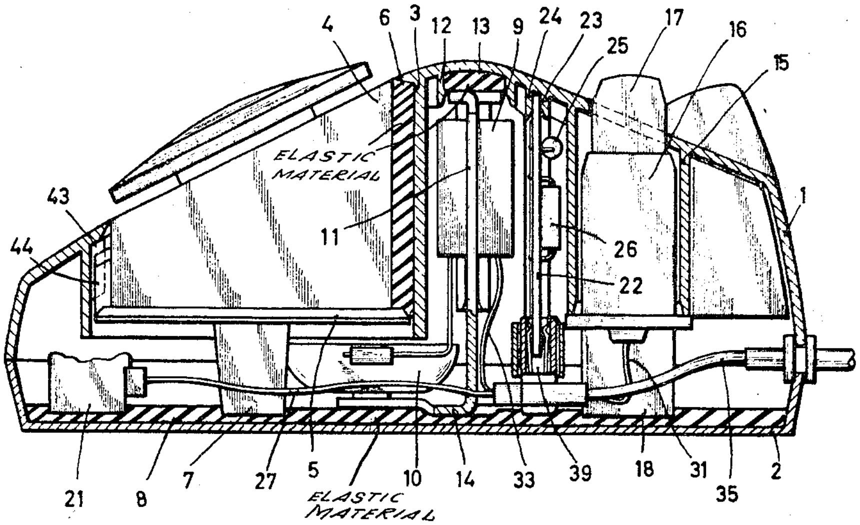
FIG. 1 is a sectional view through a telephone set constructed according to the invention, taken approximately on the line 1—1 of FIG. 4, comprising component elements which are clamped in position between the housing cover and the base plate.

The housing of the telephone set comprises the cover 1 and the tub-shaped base plate 2 connected therewith. Interiorly of the housing cover are arranged ribs forming a plurality of shaft-like means projecting in the direction of the base plate, for receiving the component elements. Thus, there is provided a shaft-like receiving means delimited by the rib 3 for receiving the dial mechanism 4 which is initially loosely inserted therein. The dial mechanism 4 is provided with a flange 5 abutting peripherally against an elastic insert 6. An extension 7 carried by the dial mechanism engages an elastic pad 8 disposed upon the inside wall of the base plate 2. Upon placing the base plate 2 into assembled position with the housing cover 1, the pad 8 will press against the extension 7, thereby pressing the dial mechanism 4 in secured position with the flange 5 thereof peripherally in engagement with the elastic insert 3. The ringer coil 9 which is together with the bells 10 upon an angularly shaped carrier 11, is positioned within receiving means formed by members 12, 49 as well as ribs 50, 51 forming U-shaped channels, the carrier 11 of the ringer being placed into such receiving means with interposition of an elastic insert 13 which engages the inside of the housing cover 1. The carrier 11 is provided with an angular extension 14 which is with assembled base plate held in engagement with the elastic pad 8, thus securing the ringer parts in assigned position.

Ribs such as 15 are provided, forming a shaft-like receiving means for the hook switch, an insulating member 16 being provided in which are guided the hook switch actuators 17, such insulating member also carrying the hook switch contacts which are not visible in the drawing. The hook switch device is secured in its assigned position within its receiving means, by the extension 17 which is, in assembled position of the base plate 2, in engagement with the elastic pad 8 provided inside of the housing above the base plate 2 thereof. Ribs such as 19 are provided within the housing cover, forming another shaft-like receiving means for the grounding button 20 and the contact springs thereof, the grounding button being contained within an insulating member 21 which also serves as a carrier for the corresponding spring set. The member 21 is likewise secured in the assigned position by being clamped between the housing cover 1 and the base plate 2.

The interior wiring of the telephone set is provided upon an insulating plate 22, for example, in the form of a printed circuit, such plate being inserted between channel-forming ribs such as 23, 24, provided within the housing cover, and also serving as a carrier for relatively light weight parts such as the resistors 25, 26, which are directly connected with the interior circuit wiring.

Figure 4:
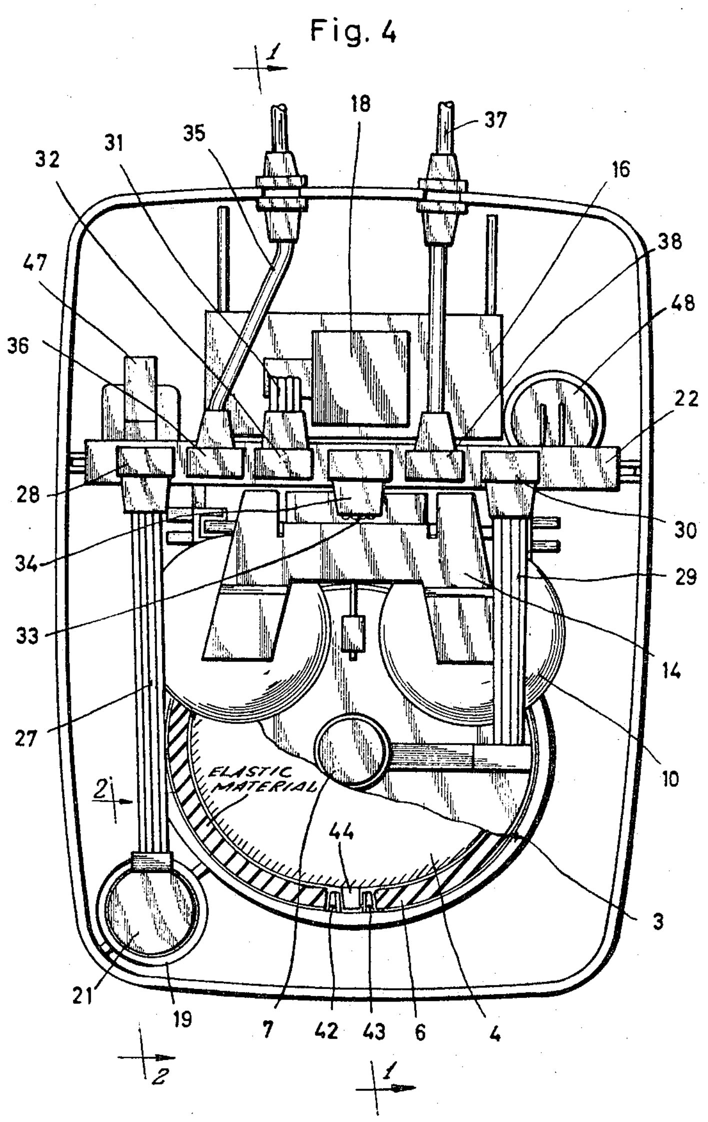
FIG. 4 shows a view of the housing cover, illustrated in FIG. 3, as seen from below with the component elements in assigned position therein.

The terminal wires of the respective component elements are provided with plug or connector means. Thus, as shown in FIG. 4, the terminal wires 27, 29, 31, 33, respectively extending from the contact spring set of the grounding button 19, the dial mechanism 4, the switch hook device 16, and the ringer coil 9, are provided with plug means respectively indicated in FIG. 4 by numerals 28, 30, 32 and 34. The apparatus cord 35 is provided with a plug 36 and the cord 37 of the hand set is provided with a plug 38.

Socket means for receiving the respective plugs are provided along the lower edge of the wiring plate 22 which faces the base plate 2 of the housing, one of these socket means being visible in FIG. 1 and marked by numeral 39. The plugs which form in their inserted positions connections extending between the respective component elements and the interior wiring carried on the insulating plate 22, are together with the wiring plate 22 secured in assigned position by being clamped between the housing cover 1 and the base plate 2, with interposition of the elastic pad 8, whereby the plugs are held against inadvertent displacement.

The insulating wiring plate 22 is not only held between the ribs 23, 24 formed on the inside top wall of the housing cover 1 but also between ribs such as 40, 41 extending from the inside of the side walls of the housing cover, whereby the wiring plate is securely positioned in place within the housing.

Figure 2:
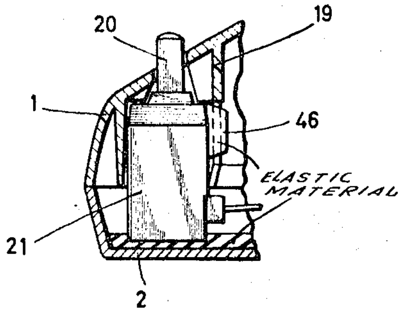
FIG. 2 illustrates a detail of the telephone set, taken approximately on the line 2—2 of FIG. 1.
Figure 3:
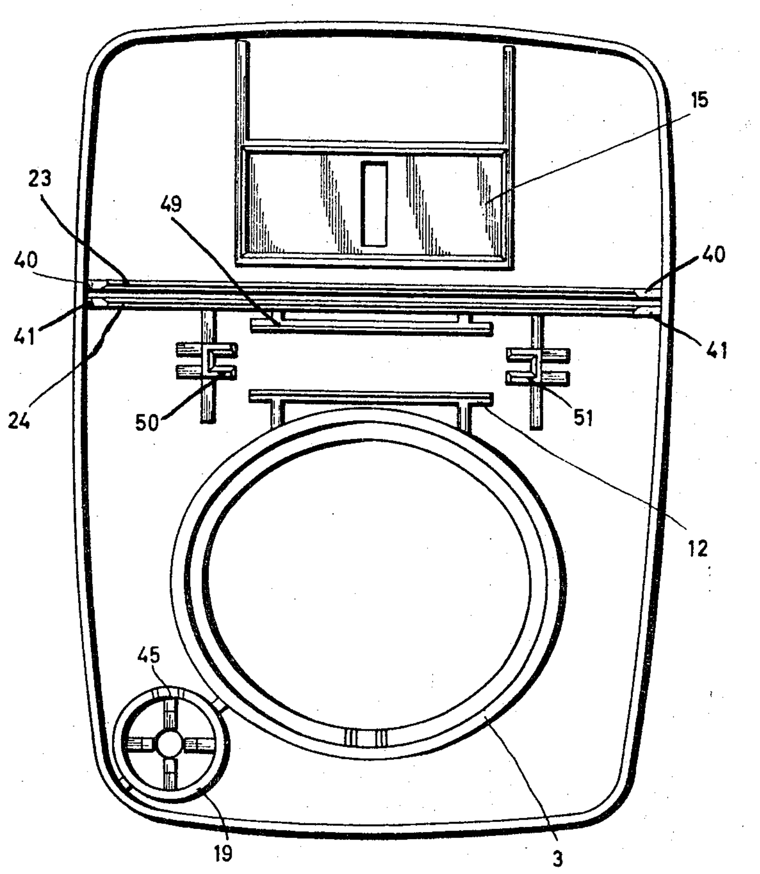
FIG. 3 represents a view of the housing cover, illustrated in FIG. 4, as seen from below, without the component elements.

The shaft-like receiving means for the dial and its mechanism and for the carrier of the grounding button are provided with guide means for assuring proper insertion of the respective components. Thus, there are proxided extensions 42, 43 (FIGS. 1 and 4) in the receiving means for the dial mechanism for placing the radial rib 44 extending from the latter. A recess 45 (FIG. 3) is provided in the receiving means for the insulating member 21 of the grounding button 20 for accommodating a keying extension 46 (FIG. 2).

As mentioned before with reference to FIG. 1, the insulating wiring plate 22 carries the resistors 25, 26 and, as particularly shown in FIG. 4, it also serves as a carrier for the induction coil 47 and for the capacitor 48.

The invention is not inherently limited to the exact details of the illustrated and described embodiment. It is within the scope of the invention possible to construct one of the mounting parts, for example, the base plate of the housing, in subdivided manner in a plurality of parts so as to gain access, for example, to the plugs independently of the remaining component elements.

Changes may be made within the scope and spirit of the appended claims which define what is believed to be new and desired to have protected by Letters Patent.

I claim:

1. A telephone set comprising a plurality of component elements, a housing including a cover member and a base member, at least one of said members forming mounting means common to said component elements, means for clamping in mounted position at least some of said component elements between said common mounting means, said mounting means including means for initially receiving predetermined component elements in relatively loose engagement therewith, said component elements being by the other of said members secured in inserted position in the respective receiving means, key guide means formed on the respective receiving means, and keying means carried by predetermined component elements for cooperation with said key guide means for the purpose of assuring insertion of the corresponding component elements in proper position thereof.

2. A telephone set according to claim 1, comprising elastic insert means interposed between the mounting means and the respective component elements clamped therebetween.

3. A telephone set according to claim 1, comprising contact sets and actuating means for each contact set, each contact set being structurally combined with its respective actuating means to form a component element.

References Cited by the Examiner

UNITED STATES PATENTS

| | | | |
|---|---|---|---|
| 2,544,325 | 3/1951 | Johnson | 179—100 |
| 2,548,723 | 4/1951 | Houdek | 179—100 |
| 2,559,651 | 7/1951 | McLarn | 179—100 |
| 2,718,563 | 9/1955 | Nicholides | 179—179 |
| 2,930,858 | 3/1960 | Hollingsworth | 179—107 |

KATHLEEN H. CLAFFY, *Primary Examiner.*

THOMAS B. HABECKER, *Examiner.*

W. C. COOPER, *Assistant Examiner.*